G. J. KONICEK.
AUTOMOBILE CURTAIN SUPPORT.
APPLICATION FILED JAN. 7, 1922.
1,420,710.
Patented June 27, 1922.
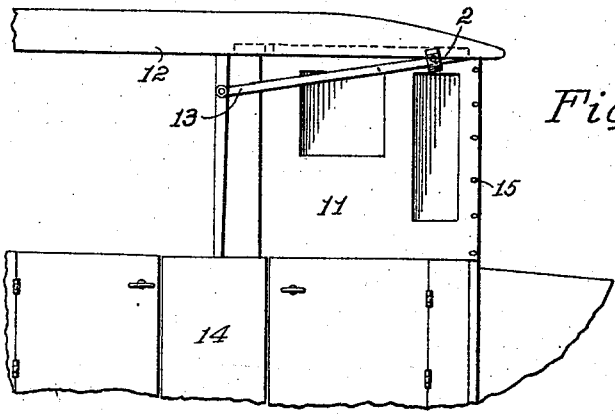
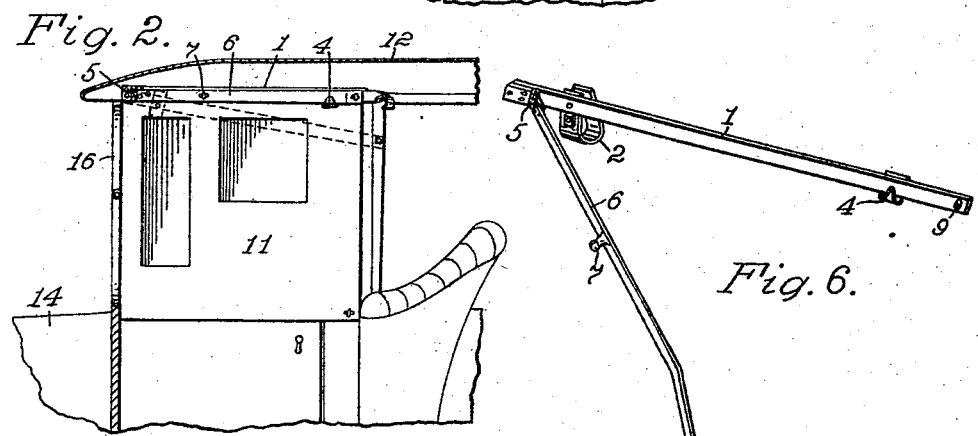
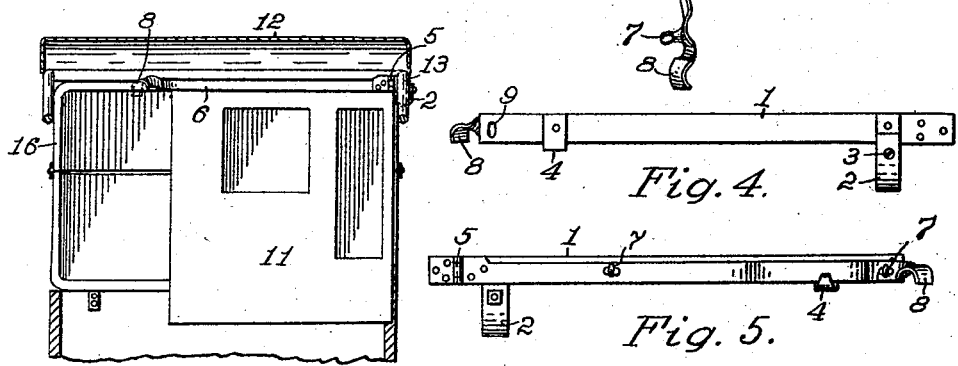
Inventor,
G. J. Konicek, by
Jno. C. Kennedy,
Attorney.

UNITED STATES PATENT OFFICE.

GEORGE J. KONICEK, OF BRUCE TOWNSHIP, BENTON COUNTY, IOWA.

AUTOMOBILE CURTAIN SUPPORT.

1,420,710.      Specification of Letters Patent.    Patented June 27, 1922.

Application filed January 7, 1922. Serial No. 527,719.

*To all whom it may concern:*

Be it known that I, GEORGE J. KONICEK, a citizen of the United States of America, and a resident of Bruce Township, Benton County, Iowa, have invented certain new and useful Improvements in Automobile Curtain Supports, of which the following is a specification.

My invention relates to improvements in automobile curtain supports, and the object of my improvement is to furnish a swinging supporting device for a side-curtain of an automobile top, adapted to be moved inwardly of the vehicle and releasably secured to a part thereof, to give clearance for the entrance or exit of a passenger.

This object I have accomplished by the means which are hereinafter described and claimed, and which are illustrated in the accompanying drawings, in which Fig. 1 is a fragmental side elevation of an automobile equipped with my improved device; Fig. 2 is a longitudinal vertical section of the same looking toward the device, with its parts closed together, and Fig. 3 is a transverse section, showing the swinging arm of the device with the suspended curtain swung over toward and releasably secured to the top frame bar of the windshield. Figs. 4 and 5 are elevations of opposite sides of the device, on a larger scale. Fig. 6 is a perspective view of the device, showing the swinging arm opened away from the fixed arm.

Similar numerals of reference denote corresponding parts throughout the several views.

My improved device is applicable to passenger automobiles 14 which have removable tops 12 and side curtains such as 11 over the side doors. Such curtains are usually so mounted and depend in such a manner as to more or less obstruct the entrance or passage in or out of the automobile by way of such a door. My device is adapted to obviate this inconvenience.

The numeral 1 denotes a horizontal bar positioned longitudinally along the inner face of the side of the top 12. The rear end of the bar has a slot 9 to receive a turnhead fastener (not shown) projecting inwardly from the frame of the top 12, and on the other end of the bar is pivotally mounted a hook or clamp-member 2 which surrounds and is secured to one of the bows 13 by means of a bolt and nut connection 3. By these means, said bar is rigidly mounted upon the top frame.

The numeral 6 denotes a bar whose forward end is hinged to the forward end of the bar 1 at 5 to swing into the vehicle away from the bar 1. A hook 4 is fixed to the rear part of the bar 1, and into this hook the rear part of the bar 6 may be elastically sprung to hold said bar 6 against the bar 1 when so closed together. Said bar 6 may have a slight bend as shown in Fig. 6 which, when the bars are closed together, resiliently reacts to hold the bar 6 in engagement with the hook 4. Two or more turn-head fasteners 7 are mounted on the inner face of the bar 6 to receive and hold the upper marginal edge of the curtain 11. The front vertical edge of said curtain may be similarly secured at 15 to a part of the vehicle if desired.

The outer or free end of the bar 6 is shaped into a downwardly opening hook 8. When the bars are closed together, the curtain 11 depends to close the side opening over a door. When the bar 6 is lifted out of the hook 4 and swung inwardly toward the wind-shield 16, it may be sprung upwardly slightly to engage the hook 8 with the top frame bar of the shield where the elastic reaction of the bar tends to retain it, as shown in Fig. 3. This holds the curtain completely out of the way of an entering or departing passenger, while the curtain falls short of and does not interfere with the steering-wheel not shown.

The device is inexpensive, being of simple construction having but few parts, and is entirely out of the way in any of its positions.

Modifications of this device are nevertheless covered by the principle of this invention.

Having described my invention, what I claim as new and desire to secure by Letters Patent, is:

1. The combination with a vehicle and its wind-shield, and supporting means on the vehicle adjacent the wind-shield, of a bracket-bar mounted rigidly and removably on said supporting-means angularly relative to the wind-shield, and a curtain-carrying bar having one extremity swingingly connected to said bracket-bar to swing inwardly and having its opposite free end bent to hook releasably upon the top of said wind-shield when it is swung away from the bracket-bar.

2. The combination with a vehicle and its wind-shield, and supporting means on the vehicle adjacent the wind-shield, of a bracket-bar mounted rigidly and removably on said supporting-means angularly relative to the wind-shield, a curtain-carrying bar having one extremity swingingly connected to said bracket-bar and having its opposite free end bent for occasional interlocking engagements with said wind-shield when it is swung away from the bracket-bar, said curtain-carrying bar having releasable fastening-means thereon for supporting a curtain therein, and a curtain suspended on said bar by said fastening-means.

Signed at Waterloo, Iowa, this 12th day of Dec. 1921.

GEORGE J. KONICEK.